United States Patent Office 3,471,595
Patented Oct. 7, 1969

3,471,595
PROCESS FOR THE MANUFACTURE OF PULVERULENT FERROMANGANESE
Klaus Feldmann and Klaus Frank, Hermulheim, near Cologne, and Wilfried Gerhardt, Knapsack, near Cologne, Paul Schmidt, Frankfurt am Main-Griesheim, and Joachim Kandler, Hurth, near Cologne, Germany, assignors to Knapsack Aktiengesellschaft, Knapsack, near Cologne, Germany, a corporation of Germany
No Drawing. Filed Apr. 8, 1966, Ser. No. 541,123
Claims priority, application Germany, May 5, 1965, K 56,002
Int. Cl. B29c 23/00
U.S. Cl. 264—12                                11 Claims

ABSTRACT OF THE DISCLOSURE

A process for the production of pulverulent ferromanganese useful in sheathing compositions of welding electrodes comprising admixing a melt of ferromanganese affine or suraffine at a temperature of 1260 and 1680° C., with 0.5 to 3.5% by weight of aluminum or silicon in the form of ferrosilicon, silico-maganese, silico-aluminum or mixtures thereof and atomizing the resulting mixture with water, steam or air.

---

The present invention relates to a process for the manufacture of pulverulent ferromanganese formed of grains enveloped by an oxide skin for use as a constituent of sheathing compositions of extruded types of welding electrodes, wherein a ferromanganese melt is quenched.

Ferro-alloys used in finely divided form for the manufacture of sheathing compositions for extruded types of welding electrodes have to meet various specifications. In French Patent No. 1,305,663 it has been proposed, for example, to use ferrosilicon with a fairly regular degree of grain size distribution, the grains having a smooth and rounded-off, preferably a spherical surface area, and being passivated with respect to the waterglass such as ordinarily used as a binding agent in the sheathing composition. Pulverulent ferrosilicon of this type is not obtained by grinding, but by atomizing a ferrosilicon melt with the aid of water, steam or gases and/or a suitable mechanical granulating device. In German Patent No. 905,445 it has been proposed for that purpose to atomize or granulate a ferromanganese melt so as to obtain particles enveloped by an oxide skin. As this extremely brief specification fails to recite any specific data relating to atomizing agent, temperature, pressure, composition of the ferromanganese, etc., it is impossible to obtain such grains as have a smooth and rounded-off, preferably a spherically shaped surface. Also, it has been found that the atomization of commercial ferromanganese, e.g., of so-called ferromanganese affine containing about 78–80% Mn, about 1–1.5% Si and about 1–1.5% C, or of so-called ferromanganese suraffine containing about 88–90% Mn, about 0.1–0.3% C and about 1% Si gives a powder formed of very irregular grains which have a fissured surface area and, therefore, an unsatisfactory passivity to alkalis, such as waterglass, that hardly differs from the completely insufficient passivity of ground powders.

A still further process for making extruded types of welding electrodes has been described in Swiss Patent No. 347,062, wherein atomized iron powder alloyed with a small proportion of ferromanganese is incorporated into the sheathing composition which, however, contains metal powder formed predominantly of iron.

It is an object of the present invention to produce, under appropriate conditions, ferromanganese consisting essentially of smooth and rounded-off or spherically shaped particles of regular grain size distribution and having an excellent passivity to alkalis by atomizing a ferromanganese melt.

It is a further object of the invention to use the ferromanganese so prepared in the sheathing compositions of extruded types of welding electrodes. Due to the stability of the ferromanganese powder to alkalis, the manufacture of those electrodes is considerably facilitated, the rate of low quality goods is diminished, and the weld metal deposited by means of these electrodes meets the specifications as regards chemical analysis and mechanical quality standards.

Ferromanganese atomized in accordance with the present invention can be produced by starting from liquid ferromanganese of the type obtained e.g., from ferrosilicomanganese and manganese ore. It is also possible to remelt particulate ferromanganese, e.g., in an induction furnace, and to atomize the melt obtained. The atomization can be achieved by means of air, steam or another suitable gas or gas mixture or by means of a suitable mechanical granulating device. In any case, care must, however, be taken to ensure the presence either of chemically bound oxygen as, for example, in steam, which serves as the oxidizing agent at the high temperatures used, or of free oxygen. The atomization is preferably achieved by means of an annular clearance or annular slit nozzle through which the gas is caused to issue so as to strike and atomize the metal jet passed therethrough.

Before the molten ferromanganese (e.g., ferromanganese affiné or suraffine) is atomized, it is admixed with a proportion of a deoxydant, which is preferably aluminum and/or silicon, e.g., in the form of ferrosilicon, silico-manganese or silico-aluminum, sufficient to deoxidize the small amounts of manganese oxides, iron oxides or dissolved oxygen present in the ferromanganese melt. This incurs the formation of $SiO_2$ and $Al_2O_3$, which can be scorified by the addition of a slag former, e.g. CaO. Not more than 3% by weight Si, calculated on the weight of the molten ferromanganese should be added, as the latter already contains about 1–2% Si and as the finished atomized ferromanganese powder should contain not more than 5%, advantageously less than 3% silicon. By the addition of the deoxydant or the formation of $SiO_2$ and/or $Al_2O_3$, which is freely suspended in the melt and partially ascends therein or is scorified, the surface tension of the liquid ferromanganese is altered, a fact which must be supposed decisively to influence the atomization then to follow and the desired smooth and rounded-off grain shape of the ferromanganese particles. During the atomization, the chemically bound or free oxygen contained in at the atomizing gas envelops the ferromanganese particles with a thin oxide film imparting chemical and mechanical resistance to the grains.

The atomized ferromanganese so produced shows little reactivity toward alkaline media, e.g., sodium hydroxide solution and waterglass. Example 4 below demonstrates that the quantity of gas (hydrogen) evolved in laboratory tests upon treatment with alkalis is substantially smaller than that evolved by commercial ground ferromanganese.

The passivation achieved during the manufacture of the ferromanganese in accordance with the present invention means considerable advantages in the production of extruded types of welding electrodes as compared with the use of not-passivated, ground ferromanganese or ferromanganese which may have been atomized or granulated with a gas free from oxygen, e.g., nitrogen, but with no prior addition of a deoxydant. The reaction with waterglass is obviated, which means lesser liability of the electrodes during compression and drying to the formation of pores and cracking, and diminished rates of low quality goods. The passivation is gaining increased importance as the manufacture and drying of electrodes take place in steadily shorter intervals due to progressing automatic control in electrode production.

It has been found that welding operations performed with extruded types of welding electrodes containing ferromanganese powder produced in accordance with this invention unexpectedly incur no increase of the silicon or aluminum content in the weld metal as the oxide skin on the surface and a certain oxygen content inside the grains are sufficient to oxidize excessive silicon or aluminum. The ferromanganese atomized in accordance with the present invention contains altogether 1-5%, preferably 2-4% oxygen, presumably bound chemically in oxide form. Although, for producing sufficiently round and smooth grains, the ferromanganese melt is admixed with deoxydants, preferably with aluminum and/or silicon, e.g., in the form of ferrosilicon or silico-manganese, which means that the ferromanganese contains 1.0-5%, preferably 1.3-3% Si when silicon is added, the silicon content in the weld metal is found to be not higher than that obtained with the use of an electrode containing comercial ground ferromangenese (1-1.5% Si) in the sheathing composition. Thus, for example, an electrode of the type Es VIII s (DIN 1913) is required to give a Si-content of 0.10-0.20%, and an electrode of the type Ti VIII s is required to give a Si-content of 0.30-0.50% in the weld metal. Example 5 below demonstrates that both ground ferromanganese affine with a maximum Si-content of 1.5% and ferromanganese atomized in accordance with this invention with a Si-content of about 2.7% enable these values to be maintained. Example 5 below also discloses an exemplary formulation of an extruded type of welding electrode.

It could not be foreseen that atomized ferromanganese admixed with an increased proportion of a deoxydant, preferably with silicon, so as to produce spherically shaped grains, and used in extruded types of welding electrodes then fails to cause an increase in the Si-content in the weld metal when it also contains inside or outside some additional oxygen bound in oxide form. Also the manganese yield is not reduced by the content of oxygen which serves to scorify silicon in excess, nor are the welding properties and mechanical quality standards impaired.

The present invention relates more especially to a process for the manufacture of pulverulent ferromanganese formed of grains enveloped by an oxide skin for use as a constituent in sheathing compositions of extruded types of welding electrodes by quenching a ferromanganese melt, wherein a melt of ferromanganese affine or suraffine and, if desired, quicklime as a slag former is admixed, at a temperaturew ithin the range of 1260 and 1680° C., with 0.5-3.5% by weight, calculated on the ferromanganese, of a deoxydant, which is preferably aluminum and/or silicon in the form of ferrosilicon, silico-manganese or silico-aluminum, and the resulting mixture is atomized or granulated on a granulating plate or another suitable mechanical device with water, steam or air, under a gauge pressure of 1-12 atmospheres so as to obtain smooth and rounded-off, preferably spherically shaped ferromanganese particles having a grain size of preferably up to 0.6 mm. and containing about 70-95% by weight manganese, up to about 1.5% by weight carbon, about 1.0-5, preferably 1.3-3.0% by weight silicon, 0-0.3% by weight aluminum, and 1-5, preferably 2-4% by weight oxygen.

The following examples illustrate the invention:

EXAMPLE 1

200 kg. ferromanganese affine composed of 83.9% Mn, 1.4% Si, 1.32% C were melted in an arc furnace while adding 1 kg. CaO as a slag former. The resultant melt was deoxidized first with 9 kg. silico-manganese (about 50% Mn, 40% Si, 10% Fe) and, after removal of the slag, with 350 grams aluminum at 1590° C. The liquid alloy was atomized by means of steam under a gauge pressure of 5 atmospheres by being passed through an annular slit nozzle having a steam passage slit 2 mm. wide. About 1.6 tons/hr. steam were consumed. The metal powder so produced consisted of smooth and spherical particles composed of:

| | Percent |
|---|---|
| Fe | 12.95 |
| Mn | 78.60 |
| Si | 2.76 |
| C | 1.46 |
| P | 0.21 |
| S | <0.01 |
| Al | <0.01 |
| O | 4.00 |

The screen analysis gave the following fractions:

>0.3 mm., 16.8% by weight
0.3–0.15 mm., 12.2% by weight
0.15–0.10 mm., 13.3% by weight
0.10–0.06 mm., 30.3% by weight
<0.06 mm., 27.4% by weight The screen fraction of 0–0.3 mm. had a bulk density of 33.6 cc./100 grams.

EXAMPLE 2

1200 kg. ferromanganese affine having the composition indicated in Example 1 were melted in an induction furnace while adding 3 kg. CaO as a slag former. Before being tapped, the alloy was deoxidized by means of 3 kg. aluminum and 13 kg. ferrosilicon (75% Si) at a temperature of 1360° C. The slag was removed before and after the deoxidation, respectively. The melt was atomized with steam under a gauge pressure of 3.5 atmospheres by means of an annular clearance nozzle. 2.7 tons/hr. steam were consumed. The metal powder obtained consisted of smooth and spherical particles composed of:

| | Percent |
|---|---|
| Fe | 16.39 |
| Mn | 77.7 |
| Si | 1.7 |
| C | 1.35 |
| P | 0.14 |
| S | <0.01 |
| Al | <0.01 |
| O | 2.7 |

By screen analysis the following fractions were obtained:

>0.3 mm., 10.0%
0.3–0.15 mm., 18.4%
0.15–0.10 mm., 19.3%
0.10–0.06 mm., 21.7%
<0.06 mm., 30.6%

The screen fraction of 0–0.3 mm. had a bulk density of 29.0 cc./100 grams.

EXAMPLE 3

1200 kg. ferromanganese suraffine composed of 89.8% Mn, 0.22% C, 1.2% Si were melted in an induction furnace while adding 3 kg. CaO as a slag former. Before being tapped, the alloy was deoxidized by means of 3 kg. aluminum and 13 kg. ferrosilicon (75% Si) at a temperature of 1390° C. The melt was atomized in the manner set forth in Example 2. The metal powder obtained consisted of smooth and spherical particles composed of:

| | Percent |
|---|---|
| Fe | 10.27 |
| Mn | 84.8 |
| Si | 1.6 |
| C | 0.21 |
| P | 0.15 |
| S | <0.01 |
| Al | <0.01 |
| O | 2.95 |

The screen analysis gave the following fractions:

>0.3 mm., 13.8%
0.3–0.15 mm., 13.3%
0.15–0.10 mm., 21.8%
0.10–0.06 mm., 24.3%
<0.06 mm., 26.7%

The screen fraction of 0–0.3 mm. had a bulk density of 32 cc./100 grams.

EXAMPLE 4

The passivity to alkalis was tested. To this end, atomized ferromanganese affine, prepared in the manner described in Example 1, was compared with commercial ground ferromanganese affine, which had the following characteristic analytical data:

| | Percent |
|---|---|
| Fe | 19.59 |
| Mn | 77.9 |
| Si | 1.43 |
| C | 0.9 |
| O | 0.2 |

The two powder grades were screened in fractions. 2 grams of each fraction were treated for 4 hours at 70° C. with 15 cc. of 1/10 N NaOH, and the gas evolved was determined volumetrically.

Grain fraction:

>0.3   0.15–0.3   0.1–0.15   0.06–0.1   <0.06 mm.

Ferromanganese, ground:

0.5   1.2   4.6   7.5   27.5 cc.

Ferromanganese, atomized:

<0.5   <0.5   <0.5   <0.5   <0.5 cc.

EXAMPLE 5

Atomized ferromanganese affine, prepared in the manner described in Example 1, was used for making 3 welding electrodes of which the sheathing mass had the following composition:

ELECTRODE SHEATHINGS ACCORDING TO DIN 1913

| Type Es VIIIs, percent | Type Ti VIIIs, percent | Type Kb IXs, percent |
|---|---|---|
| FeMn, 20–25. | FeMn, 7–12. | FeMn, 2–10. |
| Quartz, 20–25. | Quartz, 8–11. | Quartz, 2–5. |
| Alkaline earth metal carbonates, 10–20. | Alkaline earth metal carbonates, 5–10. | Alkaline earth metal carbonates, 20–30. |
| Kaolin, 5–10. | Kaolin, 8–12. | Kaolin, 1–5. |
| Magnetite, 20–30. | Rutil, 48–57. | Fluor spar, 20–32. |
| | Zirconium, 0–5. | Fe-powder, 35–45. |
| | Mineral silicates, 2–12. | Mineral silicates, 5–10. |
| | | FeTi, FeSi, 1–6. |
| Binding agents: (water-glasses), balance. | Binding agents: (water-glasses), balance. | Binding agents: (water-glasses), balance. |

The same welding electrodes were prepared in control tests with commercial ground ferromanganese which had the characteristic analytical data indicated in Example 4. The weld metal was analyzed and found to contain:

| | Mn, percent | Si, percent | C, percent |
|---|---|---|---|
| Es VIIIs: | | | |
| Guide values | 0.45–0.55 | 0.10–0.20 | 0.08–0.12 |
| FeMn, ground | 0.53 | 0.15 | 0.08 |
| FeMn, atomized | 0.51 | 0.16 | 0.08 |
| Ti VIIIs: | | | |
| Guide values | 0.45–0.60 | 0.30–0.50 | 0.07–0.12 |
| FeMn, ground | 0.50 | 0.41 | 0.08 |
| FeMn, atomized | 0.50 | 0.40 | 0.08 |
| Kb IXs: | | | |
| Guide values | 0.50–0.60 | 0.30–0.40 | 0.04–0.10 |
| FeMn, ground | 0.58 | 0.43 | 0.03 |
| FeMn, atomized | 0.59 | 0.42 | 0.04 |

The same core wire had been used in all cases. It was composed of:

| | Percent |
|---|---|
| C | 0.06–0.10 |
| Mn | 0.5–0.6 |
| Si | Traces |
| Cu, max. | 0.3 |
| P, max. | 0.03 |
| S, max. | 0.03 |
| Fe | Balance |

We claim:

1. A process for the production of pulverulent ferromanganese formed of grains enveloped by an oxide skin for use as a constituent in sheathing compositions of extruded welding electrodes comprising admixing a melt of ferromanganese affine or suraffine at a temperature within the range of 1260 and 1680° C., with 0.5 to 3.5% by weight, calculated on the ferromanganese, of a deoxidant selected from the group consisting of aluminum and silicon in the form of ferrosilicon, silico-manganese, silico-aluminum or mixtures thereof and atomising the resulting molten mixture with at least one member selected from the group consisting of water, steam and air under a gauge pressure of 1 to 12 atmospheres thereby obtaining smooth and rounded-off ferromanganese particles containing about 70 to 95% by weight manganese, up to 1.5% by weight carbon, about 1.0 to no more than 5% by weight silicon, 0 to 0.3% by weight aluminum, and 1 to 5% by weight oxygen.

2. A process as claimed in claim 1, wherein the ferromanganese melt is admixed with quicklime to serve as a slag former.

3. A process as claimed in claim 1, wherein the resulting ferromanganese particles have a spherical shape and a grain size of up to about 0.6 mm.

4. A process as claimed in claim 1, wherein the resulting ferromanganese particles contain 1.3–3.0% by weight silicon.

5. A process as claimed in claim 1, wherein the resulting ferromanganese particles contain 2–4/ by weight oxygen.

6. A process for the production of pulverulent ferromanganese formed of grains enveloped by an oxide skin for use as a constituent in sheathing compositions of extruded welding electrodes comprising admixing a melt of ferromanganese affine or suraffine at a temperature within te range of 1260 and 1680° C., with 0.5 to 3.5% by weight, calculated on the ferromanganese, of a deoxidant selected from the group consisting of aluminum and silicon in the form of ferrosilicon, silico-manganese, silico-aluminum or mixtures thereof and granulating the resulting molten ferromanganese mixture with water thereby obtaining smooth and rounded-off ferromanganese particles containing about 70 to 95% by weight manganese, up to 1.5% by weight carbon, about 1.0 to no more than 5% by weight silicon, 0 to 0.3% by weight aluminum, and 1 to 5% by weight oxygen.

7. The process as claimed in claim 6, wherein the molten ferromanganese mixture is granulated with water on a granulating plate.

8. A process as claimed in claim 6, wherein the ferromanganese melt is admixed with quicklime to serve as a slag former.

9. A process as claimed in claim 6, wherein the resulting ferromanganese particles have a spherical shape and a grain size of up to about 0.6 mm.

10. A process as claimed in claim 6, wherein the resulting ferromanganese particles contain 1.3–0.3% by weight silicon.

11. A process as claimed in claim 6, wherein the resulting ferromanganese particles contain 2–4% by weight oxygen.

References Cited

UNITED STATES PATENTS 3,010,819  11/1961  Naeser et al. _____ 264—12
3,243,288  3/1966  Feldman et al. _____ 264—12

FOREIGN PATENTS 938,671  10/1963  Great Britain.

ROBERT F. WHITE, Primary Examiner

J. R. HALL, Assistant Examiner

U.S. Cl. X.R.

264—15